United States Patent [19]

Camm

[11] Patent Number: 5,377,621

[45] Date of Patent: Jan. 3, 1995

[54] HYGIENIC ANIMAL FEEDER

[76] Inventor: Samuel A. Camm, 506 Country Club Rd., New Canaan, Conn. 06840

[21] Appl. No.: 177,778

[22] Filed: Jan. 5, 1994

[51] Int. Cl.⁶ ............................. A01K 7/00; A01K 5/01
[52] U.S. Cl. ........................................... 119/61; 119/72
[58] Field of Search ..................... 119/61, 51.5, 72, 73

[56] References Cited

U.S. PATENT DOCUMENTS

| | | | |
|---|---|---|---|
| 4,286,546 | 9/1981 | Moore | 119/61 |
| 4,691,664 | 9/1987 | Crowell | 119/61 |
| 4,708,091 | 11/1987 | Schafer | 119/61 |
| 4,762,087 | 8/1988 | Henecke | 119/61 |
| 5,002,017 | 3/1991 | Hollyday et al. | 119/61 |

FOREIGN PATENT DOCUMENTS

| | | | |
|---|---|---|---|
| 234529 | 5/1960 | Australia | 119/61 |
| 423080 | 1/1935 | United Kingdom | 119/61 |

*Primary Examiner*—John G. Weiss
*Attorney, Agent, or Firm*—Morgan & Finnegan

[57] ABSTRACT

A pet drinking dish including a steeped interior forming an interior shoulder, upon which rests a screen for preventing the consumption of animals, such as dogs, of pet hairs and dirt settling on the bottom of the dish.

The dish also features a locking mechanism for the screen and a hollow interior for selectively weighting the drinking dish.

6 Claims, 3 Drawing Sheets

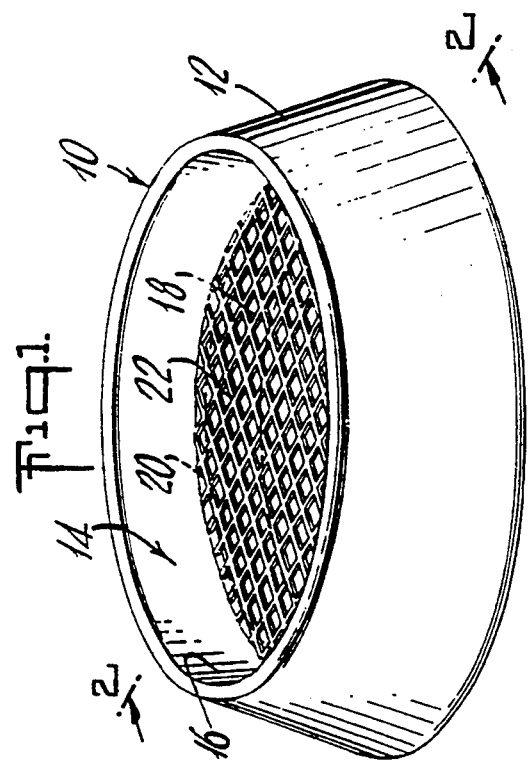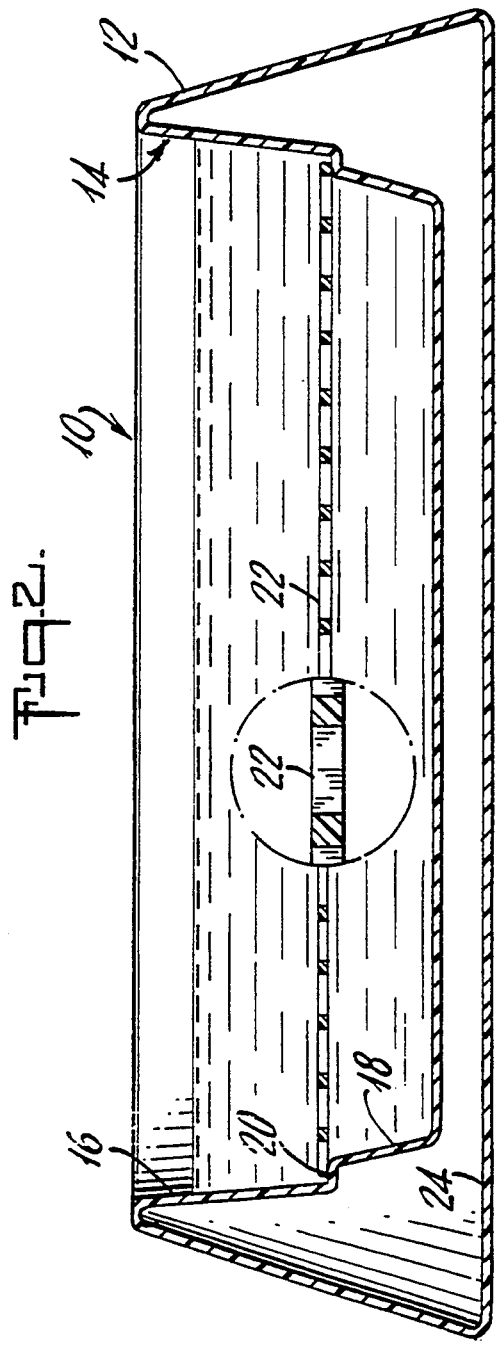

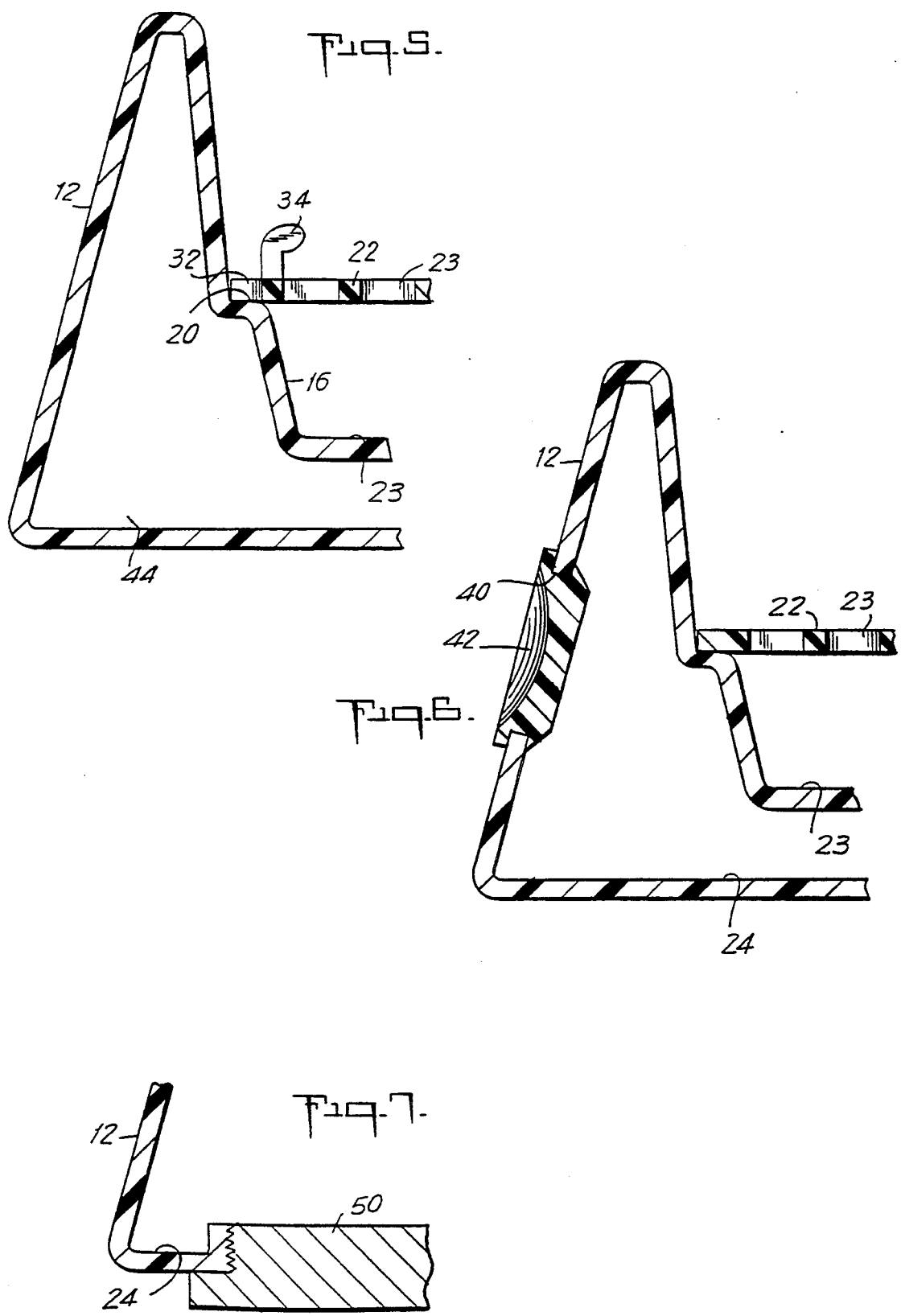

HYGIENIC ANIMAL FEEDER

This invention relates primarily to pet dishes and more particularly to such dishes suitable for a dog's drinking water, or his food.

Pet dishes are family household items today and usually include simple, dish-shaped elements whereby water or food is placed in the dish for consumption by a pet, who simply projects his nose and mouth into the dish. If the pet has long hair which picks up dirt attached to the pet's whiskers and ears, such dirt will fall into the water and be consumed by the pet when he reaches the bottom of the interior of the drinking dish during his drinking process. Furthermore, ordinary dust and dirt particles in the environment of the drinking dish settle to the bottom of the interior, whereby the pet drinks the water and also consumes the dust and dirt on the bottom.

Similar problems have been recognized in bird feeders, for instance, whereby it is known that a bird's feet pick up dirt which can contaminate his drinking water. Designers of bird feeders have thereby devised screening systems in which the actual drinking bowl is smaller than, and stands above, a main bowl which is screened at its top surface to support the bird's feet.

Also, drinking cups and the like for use by humans have been designed to comprise screens affixed to the interior thereof in order to prevent ice or seeds from going into the consumer's mouth when the drinking cup is tipped for drinking.

Accordingly, a primary object of the present invention is to provide a pet drinking dish which prevents the consumption by the pet of dirt or other foreign matter with the water in the dish.

A further and more particular object is to provide a pet drinking dish particularly suitable for dogs which prevents the consumption by the dog of dirt and dust from his whiskers and ears along with the water, and which is designed particularly for the dog's method of water consumption.

A still further object of the present invention is to provide a pet dish which is weighted to prevent unintentional toppling, and at other times unweighted, such as during shipping.

A further object of the present invention is to provide a means for separating dirt and dust from the animal, while preventing the animal from removing such means.

Other objects and advantages of the present invention are provided in a pet dish according to the present invention which features a substantially cylindrical exterior and a slightly conical interior which is stepped to provide a shoulder, upon which rests a filtering screen to enable the admission to the bottom of the dish of foreign particles, but prevents access thereto by the dog's mouth or tongue. The step is provided proximate the bottom of the dish to enable maximum consumption by the pet of the contents of the dish, but without contamination. The filtering screen and the dish are made from the same material, preferably plastic, and the screen is readily removable due to the slightly conical shape of the interior, for cleaning and the like. The filtering screen is keyed and locked with respect to the conical interior wall so that it is not readily removable by the pet, and yet the owner, by lining up the key way with a locking partition can easily remove the filter for cleaning or for converting the dish to an eating rather than a drinking dish. Furthermore, a covered opening in the outside wall of the dish provides a passage for sand or other weighting materials in order to weight the dish and thereby stabilize it during use. Removability of the weighting materials provides the convenience of lightweight shipping for the manufacturer, while enabling stable use characteristics. In an alternative embodiment, weighting capability is provided by a removable, screw-fitted bottom weighting member.

Other objects, features and advantages of the present invention will become apparent by reference to the following, more detailed description of a preferred, but nonetheless illustrative, embodiment, with reference to the accompanying drawings, wherein:

FIG. 1 is an isometric representation of a pet drinking dish according to the present invention, with a filtering screen in its inserted position with respect to the dish;

FIG. 2 is a side, sectional view taken along the center line of FIG. 1, and showing particularly the filtering screen resting on the stepped shoulder of the interior wall, which is formed of a slightly conical shape and also showing an enlarged portion of the filtering screen to illustrate a representative shape therefore.

FIG. 5 is a sectional view taken along the line 5—5 of FIG. 3 and showing particularly the removal mechanism for the filtering screen;

FIG. 6 is a sectional view taken along the line 6—6 of FIG. 3 and showing particularly the covered opening for insertion and removal of weighting materials; and FIG. 7 is a partial view in section, of an alternative embodiment whereby the weighting of the dish is provided by a removable, screw-fitted weighting plug for insertion at the bottom of the dish.

Figure 3:
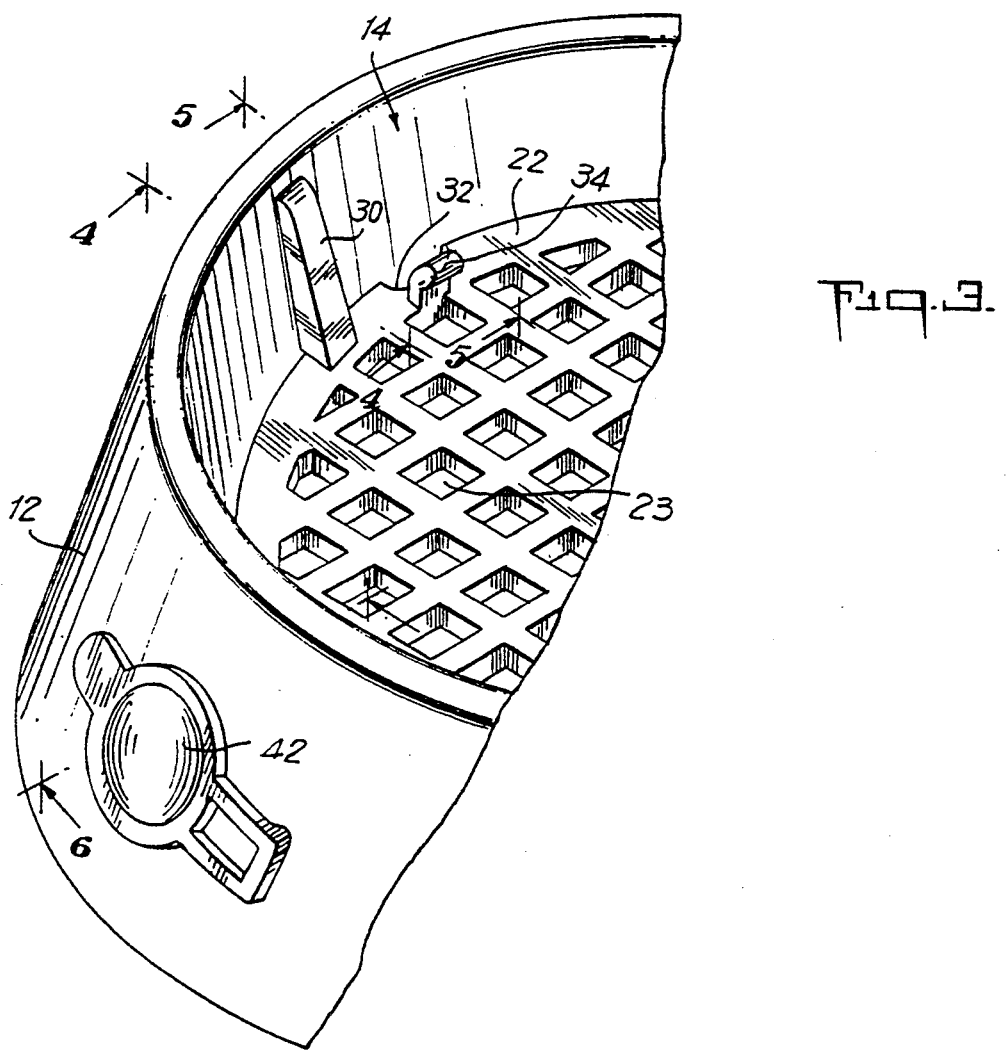
FIG. 3 is a partial view of the dish of the present invention, similar to that of FIG. 1, but with a covered opening for insertion and removal of weighting materials and a locking and removal mechanism for the filtering screen.

Referring to the drawings and particularly FIGS. 1 and 2 thereof, a pet drinking dish generally designated 10, is shown to include an exterior wall 12 and an interior wall generally designated 14. Interior wall 14 comprises a top interior wall portion 16 and a bottom interior wall portion 18, separated by a stepped shoulder 20. Said shoulder 20 is provided for accommodating a filtering screen 22, which is formed into a grid pattern of crossed screen elements, each of which is generally square in cross-section. Filtering screen 22 is of a material the same or similar to that of drinking dish 10 and may be formed by a waffle-like plastic molding element with evenly spaced large squares separated by molding cavity lines slightly larger than the desired crossed screen elements.

Thus, when dish 10 has its interior 14 substantially filled with water, a small portion of the water will remain below filter screen 22. Thus, if a dog who has picked up dirt and other foreign matter on his whiskers or ears, drinks from the dish, such dirt and foreign matter will drop through filtering screen 22 to a position therebelow. When the dog drinks from the dish, the major proportion of the water above the screen will be the portion consumed, rather than the dirt and foreign matter just below screen 22, which cannot be reached by the dog's tongue.

Furthermore, by the simple design technique of resting filtering screen 22 on stepped shoulder 20, such screen 22 is easily removed for periodic cleaning and/or replacement.

Of course, the distance between bottom 23 of dish 10 and screen 22 is somewhat exaggerated in the drawing for purposes of clarity of description; however, such distance is actually smaller than shown in order to provide maximum consumption capability for the animal, without compromising the efficacy of the dish 10 with respect to the objectives and purposes of this invention. A recommended distance between the screen and the bottom surface of the dish is one-eighth inch to three-eighth inches, preferably the smaller.

Figure 4:
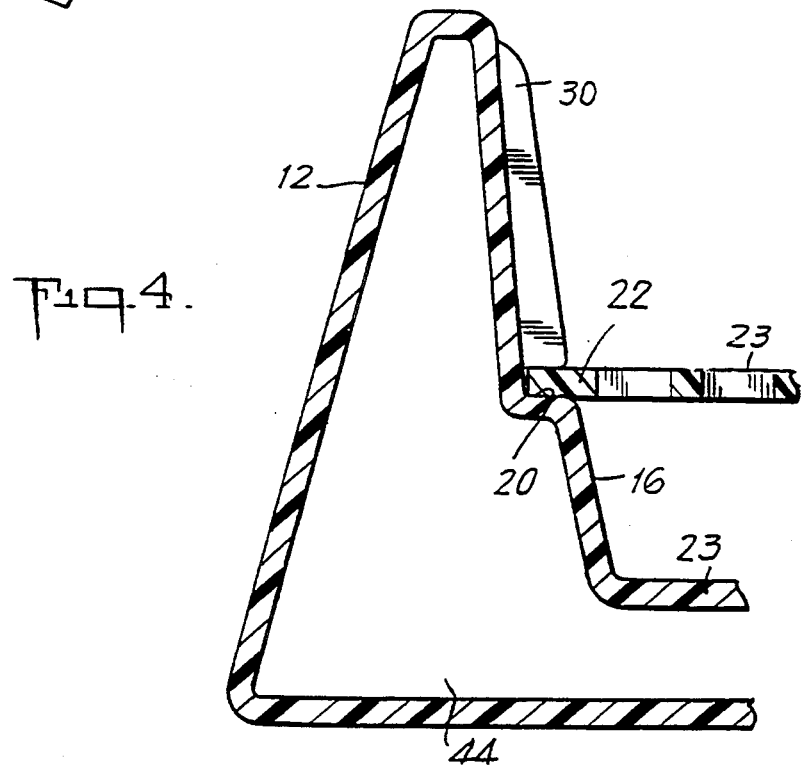
FIG. 4 is a sectional view taken along the line 4—4 of FIG. 3 and showing particularly the locking member mechanism for the filtering screen.

Referring to FIGS. 3–6, filtering screen 22 is provided with a locking mechanism comprising locking projection 30, standing outwardly from interior wall 14, locking opening 32, defined by the edge of filtering screen 22 and locking handle 34 affixed to filtering screen 22 for the purpose of rotating same. Thus, handle 34 is used to manipulate opening 32 to a position in line with projection 30. At such a point, handle 34 is used to lift filtering screen 22 with projection 30 clearing through opening 32. Bottom interior 23 of dish 10 is then cleaned, after which filtering screen 22 is replaced by lining up opening 32 with projection 30 and then using handle 34 to rotate filtering screen 22, which locks the filtering screen in place with respect to undesired removal thereof.

Exterior wall 12 defines opening 40 (FIG. 6), which is covered by plug 42, integrally molded or otherwise affixed to exterior wall 12. This opening 40 provides a passageway through which weighting materials, such as sand, water, or the like, are inserted to hollow 44 of the feeding dish. More specifically, the manufacturers and distributors; of a product made according to this invention obtain an advantage in terms of a savings in shipping weight by dealing with dish 10 in an unweighted condition. On the other hand, stability is provided during use by insertion of weighting materials through opening 40 in the hollow of the dish formed by the bottom 24, 23 thereof.

Alternatively, FIG. 7 shows the concept of selective weighting in a modified structure whereby bottom plug 50 is threadably attached to the dish bottom 24 so that weighting material is inserted or removed, as desired.

In accordance with the above invention, which is to be limited only by the following claims, the pet owner and the manufacturer obtain advantages as shown and described.

What is claimed is:

1. A pet dish, comprising an exterior wall, a generally smooth conical interior wall terminating in a bottom surface, said interior wall having a stepped shoulder proximate said bottom surface, said interior wall being free of discontinuities above and below said shoulder, and a filtering screen having screen elements removably resting upon said shoulder, said screen and bottom surface being separated such that foreign matter is caused to be admitted to the bottom surface of the dish and yet such foreign matter being inaccessible to the pet using said dish, said screen being removable to permit and facilitate access to said bottom surface from the top of said dish, said exterior wall including an integral exterior bottom wall defining with said bottom surface an interior hollow for holding weighting materials, said exterior wall also defining an opening through which said weighting materials are inserted.

2. The pet dish according to claim 1 wherein said separation is between one-eighth inch and three-eighths inches.

3. The pet dish according to claim 1 wherein said opening is threaded for affixing a bottom opening cover.

4. The pet dish according to claim 1 wherein said opening is defined by said exterior wall and said dish further comprises a plug for insertion to said opening, said plug being movably attached to said exterior wall.

5. The pet dish according to claim 1 wherein said dish further comprises a locking mechanism for locking said screen to said shoulder.

6. The pet dish according to claim 5 wherein said locking mechanism comprises a locking projection affixed to said interior wall, a locking opening defined by said screen and a locking handle affixed to said screen, whereby removal of said screen is enabled by manipulating said locking handles so that said opening is aligned with said projection.

* * * * *